United States Patent Office 2,779,755
Patented Jan. 29, 1957

2,779,755
CUPRIFEROUS TRISAZO DYESTUFFS

Hans Ruckstuhl and Walter Wehrli, Basel, Switzerland, assignors, by mesne assignments, to Saul & Co., Newark, N. J., as nominee of Fidelity Union Trust Company No Drawing. Application March 3, 1952,
Serial No. 274,652

Claims priority, application Switzerland April 25, 1951

6 Claims. (Cl. 260—145)

The present invention provides a new group of cupriferrous trisazo dyestuffs which may be defined as the copper complex compounds of the trisazo dyestuffs corresponding to the formula

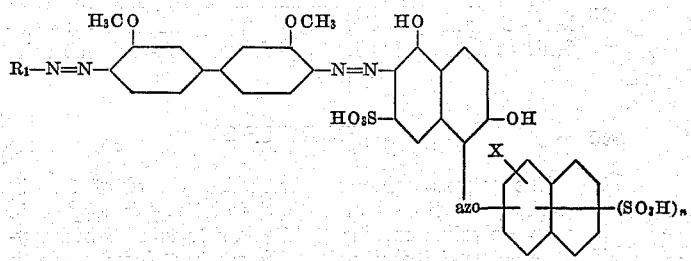

wherein $R_1$ stands for the radical of a coupling component of the pyrazolone or naphthalene series, X stands for OH in ortho-position to —azo—, and $n$ is one of the integers 1, 2 and 3.

These new dyestuffs are prepared by coupling the tetrazo compound from 1 mol of 3,3'-dimethoxy-4,4'-diamino-1,1'-diphenyl with 1 mol of a monoazo dyestuff of the formula

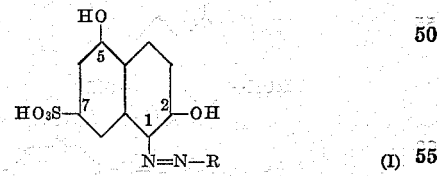

or the copper complex thereof, wherein R is the radical of a naphthalenemono-, di- or trisulfonic acid containing an hydroxyl group in ortho-position to the azo bridge, and with 1 mol of any other coupling component, the respective coupling operations being carried out in any desired order of succession, and then treating the obtained polyazo dyestuff with a copper yielding agent.

Illustrative of the radical of a naphthalenemono-, di- or trisulfonic acid which has an hydroxyl group in ortho-position to the azo group, and designated by R in the foregoing formula, are interalia the radicals of 1-hydroxynaphthalene-3-sulfonic acid,
1-hydroxynaphthalene-4-sulfonic acid,
1-hydroxynaphthalene-5-sulfonic acid,
2-hydroxynaphthalene-4-sulfonic acid,
2-hydroxynaphthalene-6-sulfonic acid,
2-hydroxynaphthalene-7-sulfonic acid,
1-hydroxynaphthalene-3,6-disulfonic acid,
1-hydroxynaphthalene-3,8-disulfonic acid,
1-hydroxynaphthalene-4,8-disulfonic acid,
2-hydroxynaphthalene-3,6-disulfonic acid,
1-hydroxynaphthalene-3,6,8-trisulfonic acid, etc.

The monoazo dyestuffs of Formula I used for the coupling can be prepared by coupling diazotized 1-amino-5-hydroxynaphthalene-7-sulfonic acid which is acylated at the 5-positioned hydroxyl group, with an hydroxynaphthalenemono-, di- or trisulfonic acid, introducing the 2-positioned hydroxyl group into the radical derived from the 1-amino-5-hydroxynaphthalene-7-sulfonic acid by oxidative coppering, and then splitting off the acyl group from the 5-positioned hydroxyl of the said radical.

As the second coupling component, which may be any desired component, use may be made of the aforementioned hydroxynaphthalenemono- and disulfonic acids, but any other compound which couples in the position adjacent a phenolic hydroxyl group or an hydroxyl group derived by enolization can also be used. Thus, use may be made for this purpose of for example sulfonated and unsulfonated pyrazolones, pyrazolone carboxylic acids, 2-amino-5-hydroxynaphthalene-7-sulfonic acid, 1-chloro-2-amino-5-hydroxynaphthalene-7-sulfonic acid, 2-acetylamino-5-hydroxynaphthalene-7-sulfonic acid, 2-benzoylamino-5-hydroxynaphthalene-7-sulfonic acid, 2-methylamino-5-hydroxynaphthalene-7-sulfonic acid, 2-phenylamino-5-hydroxynaphthalene-7-sulfonic acid, 1-amino-8-hydroxynaphthalene-4-sulfonic acid, 1-phenylamino-8-hydroxynaphthalene-4-sulfonic acid, 2-amino-8-hydroxynaphthalene-6-sulfonic acid, 2-(4'-carboxyphenylamino)-8-hydroxynaphthalene-6-sulfonic acid, 1-amino-8-hydroxynaphthalene-3,6-disulfonic acid, 1-amino-8-hydroxynaphthalene-4,6-disulfonic acid, 1-acetylamino-8-hydroxynaphthalene-3,6-disulfonic acid, 1-benzoylamino-8-hydroxynaphthalene-3,6-disulfonic acid, 1-amino-8-hydroxynaphthalene-2,4-disulfonic acid, 1-amino-8-hydroxynaphthalene-3,5-disulfonic acid, 2-amino-5-hydroxynaphthalene-1,7-disulfonic acid, 2-amino-8-hydroxynaphthalene-3,6-disulfonic acid, 2-acetylamino-8-hydroxynaphthalene-3,6-disulfonic acid, 1,8-dihydroxynaphthalene-3,6-disulfonic acid. This list of coupling compounds is wholly illustrative in character and is by no means intended to be restrictive or exhaustive.

The monoazo dyestuffs of Formula I, used for coupling, are preferably employed in the form of copper complexes, and the coupling with the tetrazotized 3,3'-dimethoxy-4,4'-diamino-1,1'-diphenyl may take place as the first stage or the second stage. The couplings are carried out in alkaline medium, preferably in a medium made alkaline with sodium carbonate, and pyridine may be added for the second stage coupling.

In order to prepare copper complexes in substance, the obtained polyazo dyestuffs are treated with copper-yielding agents until the methoxy groups are split and the dyestuff has been converted into the copper complex. The coppering of the dyestuffs may be carried out in diverse ways, for example by heating in weakly alkaline aqueous medium with copper-tetramine-hydroxide complex in the presence or absence of organic bases, or with copper salts in a fusion of an alkali salt of a low molecular weight aliphatic monocarboxylic acid.

The coppered dyestuffs have an outstanding affinity for cotton and regenerated cellulose and dye these fibers in marine-blue to gray-blue shades of very good fastness to light and good fastness to washing.

The following examples set forth representative exemplary embodiments of the invention, and these examples are intended to be solely illustrative and not at all limitative. In these examples, the parts and percentages are by weight and the temperatures are expressed in degrees centigrade. The term "soda" refers to sodium carbonate.

EXAMPLE 1

The tetrazo compound from 24.4 parts of 3,3'-dimethoxy-4,4'-diamino-1,1'-diphenyl is coupled in a soda-alkaline medium with 30.4 parts of 1-hydroxynaphthalene-3,6-disulfonic acid. The resultant intermediate is isolated and introduced into a solution of 55.2 parts of the copper complex of the monoazo dyestuff of the formula

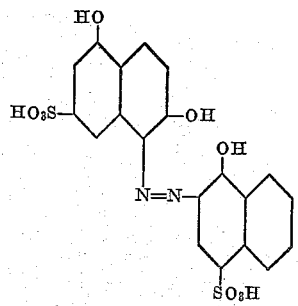

250 parts of pyridine and 50 parts of aqueous ammonia of 25% strength in 500 parts of water. Upon completion of the coupling, the trisazo dyestuff is isolated and is subjected to conventional demethylating coppering with ammoniacal copper oxide at 95° in aqueous solution in the presence of an organic base. The copper complex of the dyestuff is, in the dry state, a dark powder which dissolves in water with a blue coloration and in concentrated sulfuric acid with a blue-green coloration, and dyes cotton in fast marine-blue shades. It corresponds to the formula

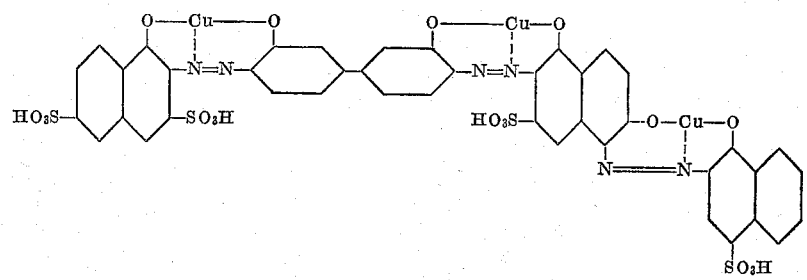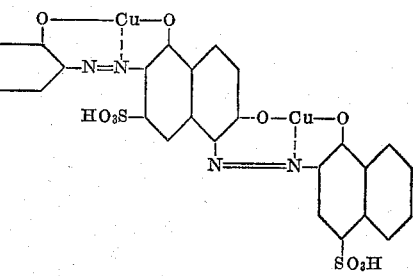

Marine-blue dyestuffs with similar properties can be obtained in entirely analogous manner by coupling the intermediate of the present example with the equivalent amount of the copper complex of the monoazo dyestuff of the formula

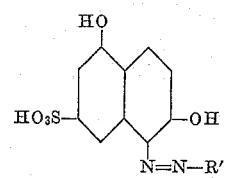

wherein R' stands for the radical of 1-hydroxynaphthalene - 5 - sulfonic acid, 2 - hydroxynaphthalene - 6 - sulfonic acid or 2 - hydroxynaphthalene - 7 - sulfonic acid.

EXAMPLE 2

The tetrazo compound from 24.4 parts of 3,3'-dimethoxy - 4,4' - diamino - 1,1' - diphenyl is coupled in a soda-alkaline medium with 30.4 parts of 1-hydroxynaphthalene-3,8-disulfonic. The resultant intermediate is isolated and introduced into a solution of 55.2 parts of the copper complex of the monoazo dyestuff of the formula

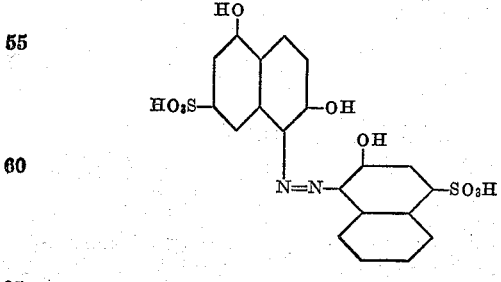

250 parts of pyridine and 50 parts of ammonia of 25% strength in 500 parts of water. Upon completion of the coupling, the trisazo dyestuff is isolated and is subjected to conventional demethylating coppering with ammoniacal copper oxide at 95° in aqueous solution in the presence of an organic base. The copper complex of the dyestuff is, in the dry state, a dark powder which dissolves in water with blue coloration and in concentrated sulfuric acid with blue-gray coloration, and dyes cotton in fast marine-blue shades. It corresponds to the formula

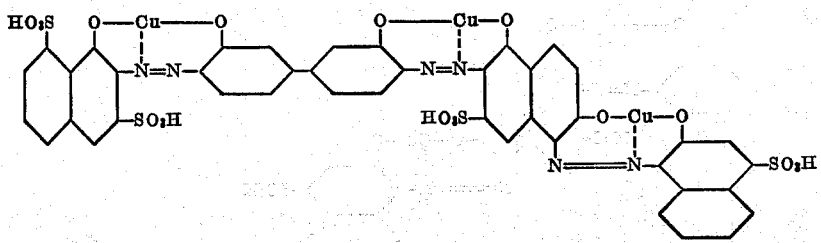

Marine-blue dyestuffs with similar properties can be obtained in entirely analogous manner by coupling the intermediate of the present example with the equivalent amount of the copper complex of the monoazo dyestuff of the formula

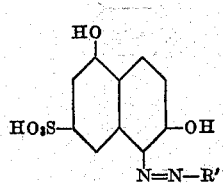

wherein R' stands for the radical of 1-hydroxynaphthalene - 5 - sulfonic acid, 2 - hydroxynaphthalene - 6 - sulfonic acid or 2 - hydroxynaphthalene - 7 - sulfonic acid.

EXAMPLE 3

The tetrazo compound from 24.4 parts of 3,3'-dimethoxy - 4,4' - diamino - 1,1' - diphenyl is coupled in a soda-alkaline medium with 22.4 parts of 2-hydroxynaphthalene-4-sulfonic acid. The resultant intermediate is isolated and introduced into a solution of 63.2 parts of the copper complex of the monoazo dyestuff of the formula

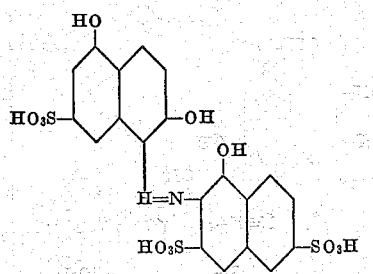

250 parts of pyridine and 50 parts of aqueous ammonia of 25% strength in 500 parts of water. Upon completion of the coupling, the trisazo dyestuff is isolated and is subjected to demethylating coppering with copper sulfate in a sodium acetate melt. In the dry state, the dyestuff is a dark powder which dissolves in water with blue coloration and in concentrated sulfuric acid in blue-green coloration, and dyes cotton in fast marine-blue shades. It corresponds to the formula

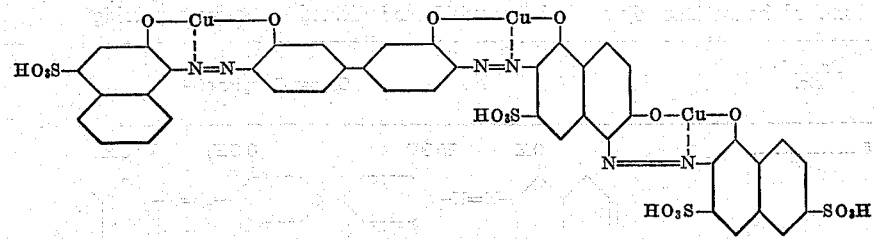

Marine-blue dyestuffs with similar properties are obtained in entirely analogous manner when the tetrazo compound is coupled with the equivalent amount of 1-hydroxynaphthalene-4-sulfonic acid or of 1-hydroxynaphthalene-5-sulfonic acid or of 2-hydroxynaphthalene-6-sulfonic acid to produce the intermediate and the latter coupled with the copper complex of the monoazo dyestuff of the present example.

EXAMPLE 4

The tetrazo compound of 24.4 parts of 3,3'-dimethoxy-4,4'-diamino-1,1'-diphenyl is coupled in a soda-alkaline medium with 55.2 parts of the copper complex of the monoazo dyestuff of the formula

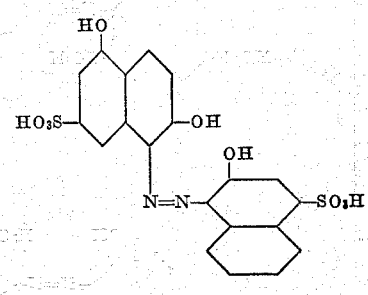

in solution in 400 parts of water. The resultant intermediate is isolated and introduced into a solution of 25.4 parts of 1-(4'-sulfophenyl)-3-methyl-5-pyrazolone and 40 parts of sodium carbonate in 500 parts of water. Upon completion of the coupling, the trisazo dyestuff is isolated and subjected to conventional demethylating coppering with ammoniacal copper oxide at 95° in aqueous solution in the presence of an organic base. In the dry state, the copper complex is a dark powder which dissolves in water with reddish blue coloration and in concentrated sulfuric acid with greenish-blue coloration, and dyes cotton in reddish gray-blue shades. It corresponds to the formula in the respective formulae) and on the other hand with 1 mol of the same or of another coupling component

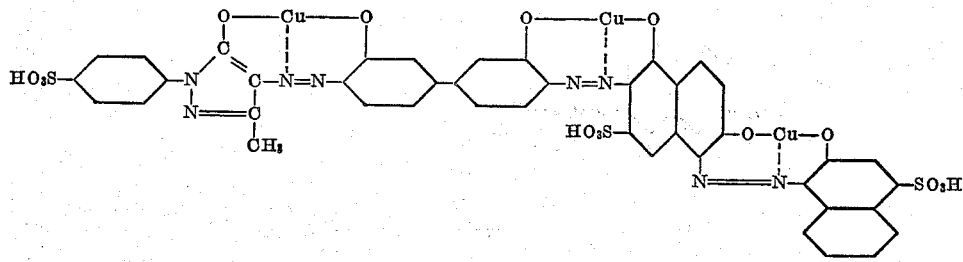

The following table sets forth additional dyestuffs which can be obtained according to the foregoing examples by coupling the tetrazo compound from 1 mol of 3,3'-dimethoxy-4,4'-diamino-1,1'-diphenyl on the one hand with 1 mol of the monoazo dyestuff of Formula I (as indicated in the respective formulae) and on the other hand with 1 mol of the same or of another coupling component (as indicated in the respective formulae) in alkaline medium, preferably soda-alkaline, and optionally with the addition of pyridine, followed by conventional demethylating coppering:

| Example No. | Copper Complex of— | Shade of Dyeing on Cotton |
|---|---|---|
| 5 | | marine-blue. |
| 6 | | Do. |
| 7 | | Do. |
| 8 | | Do. |

Products wherein the CH₃COHN-radical is replaced by CH₃NH—, C₂H₅NH—, C₆H₅NH— or CH₃·C₆H₄·NH— are very similar to No. 8.

obtained as described in Example 1, are dissolved in 30,000 parts of water, and 300 parts of sodium sulfate are added. 1000 parts of cotton are introduced at 30°, then the bath is heated to boiling temperature in 30 minutes, boiling is continued for 15 minutes, and after 15 minutes the dyed cotton is withdrawn from the dyebath, rinsed and dried.

| Example No. | Copper Complex of— | Shade of Dyeing on Cotton |
|---|---|---|
| 9 | | marine-blue. |
| 10 | | Do. |
| 11 | | reddish gray-blue. |
| 12 | | marine-blue. |

EXAMPLE 13

20 parts of the copper complex compound of the formula

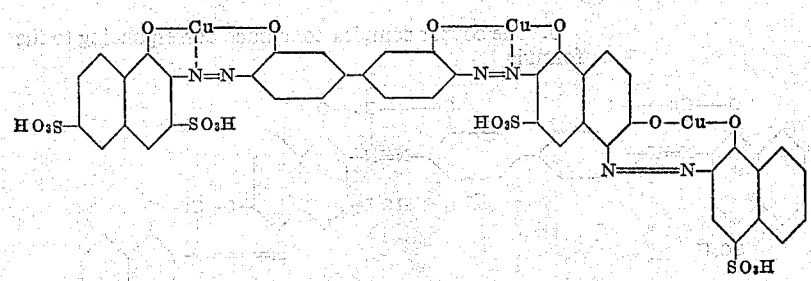

Having thus disclosed the invention, what is claimed is:
1. A copper complex compound of a trisazo dyestuff corresponding to the formula

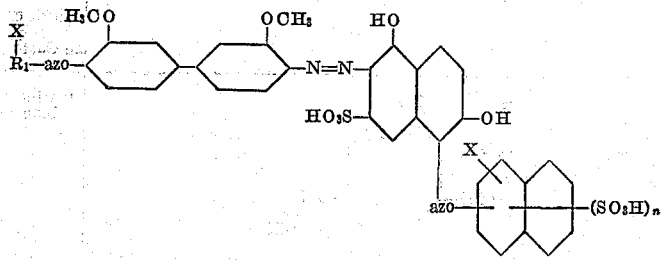

wherein

stands for the radical of a coupling component selected from the group consisting of radicals of the pyrazolone and hydroxynaphthalene series, each X stands for OH in ortho-position to —azo—, and $n$ stands for one of the integers 1, 2 and 3.

2. The copper complex compound corresponding to the formula

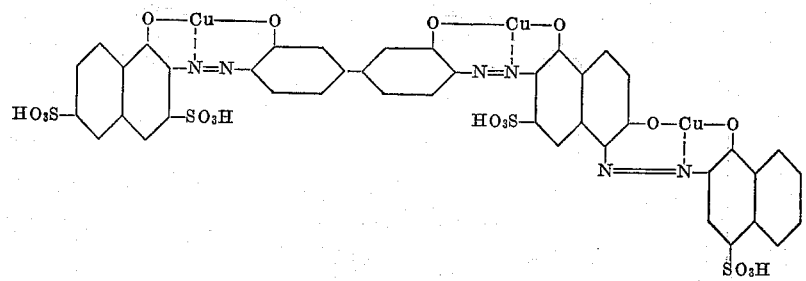

3. The copper complex compound corresponding to the formula

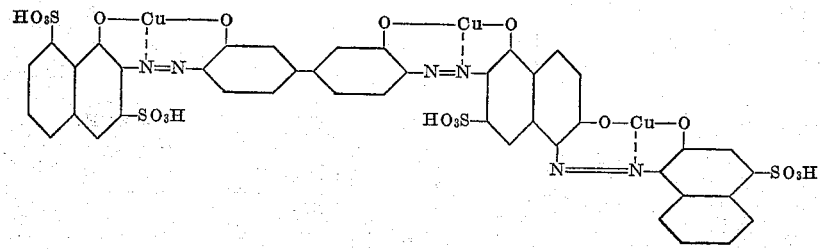

4. The copper complex compound corresponding to the formula

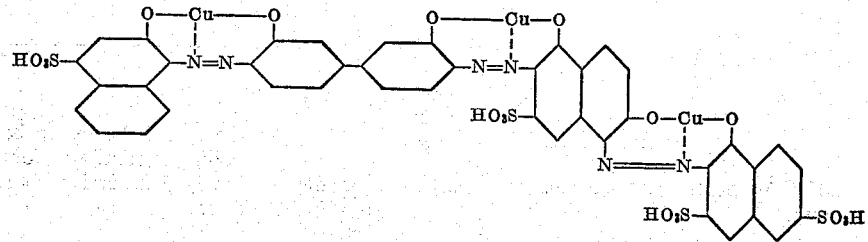

5. The copper complex compound corresponding to the formula

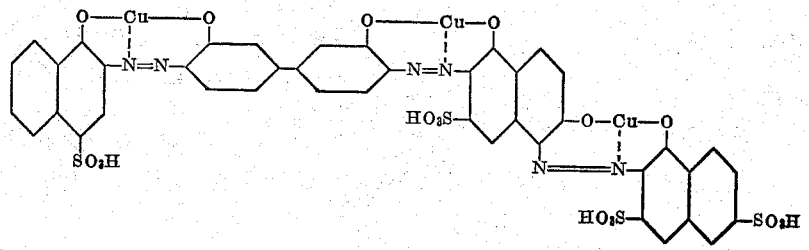

6. The copper complex compound corresponding to the formula
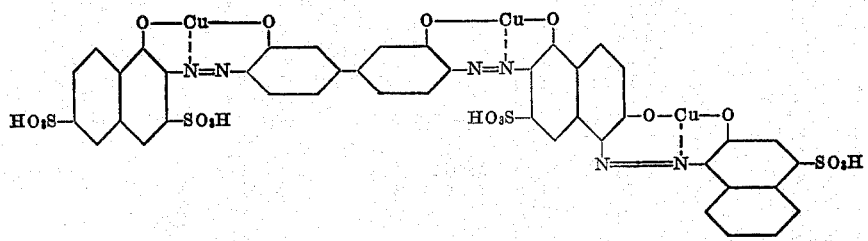
References Cited in the file of this patent
UNITED STATES PATENTS
| | | |
|---|---|---|
| 1,957,580 | Delfs et al. | May 8, 1934 |
| 2,370,500 | Sparks | Feb. 27, 1945 |
| 2,476,261 | Mayer | July 12, 1949 |
| 2,644,813 | Ruckstuhl et al. | July 7, 1953 |